Nov. 26, 1929.  H. BOLDT  1,737,073
BREEDING KENNEL
Filed April 14, 1927  3 Sheets-Sheet 1
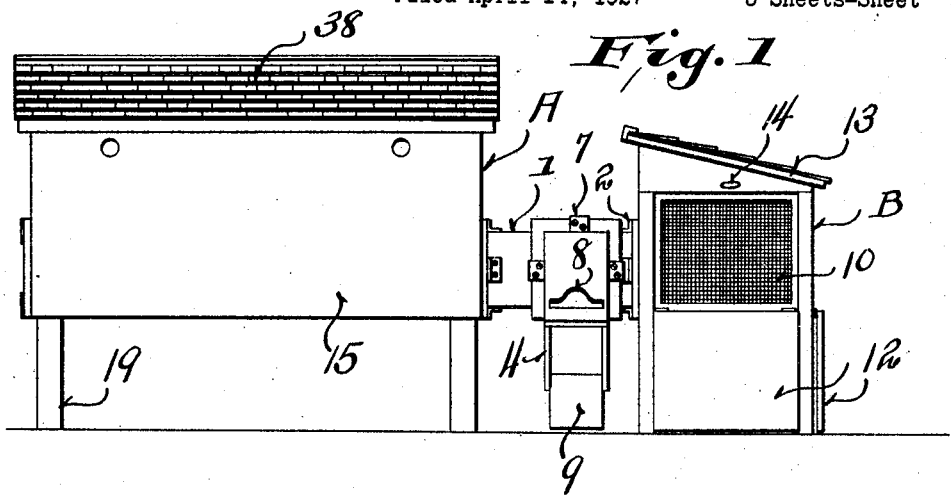
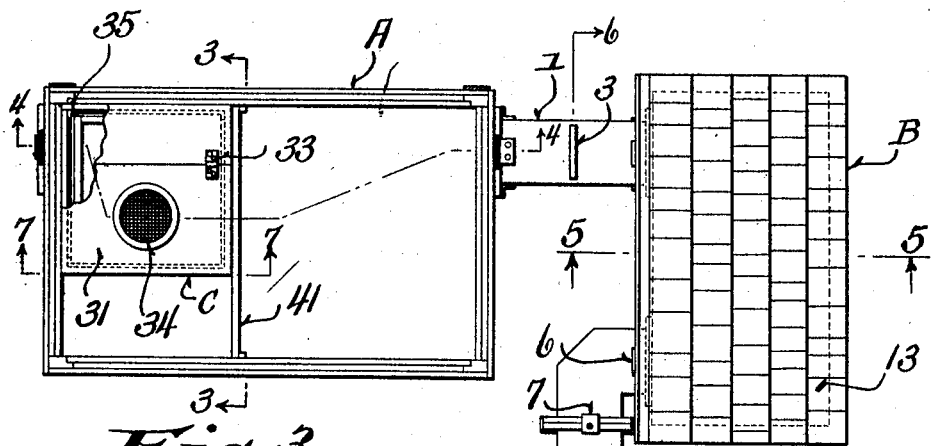
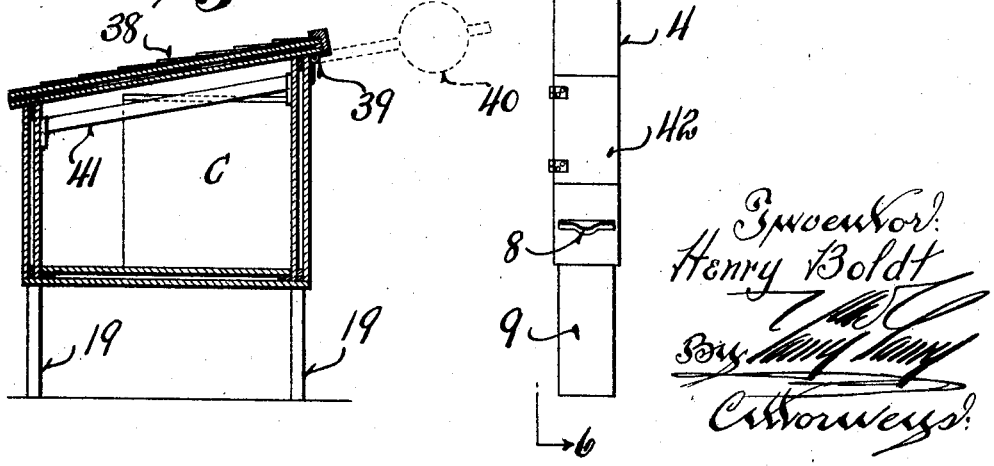
Inventor
Henry Boldt
By
Attorneys Nov. 26, 1929.  H. BOLDT  1,737,073
BREEDING KENNEL
Filed April 14, 1927   3 Sheets-Sheet 2

Inventor:
Henry Boldt

Nov. 26, 1929.  H. BOLDT  1,737,073
BREEDING KENNEL
Filed April 14, 1927  3 Sheets-Sheet 3
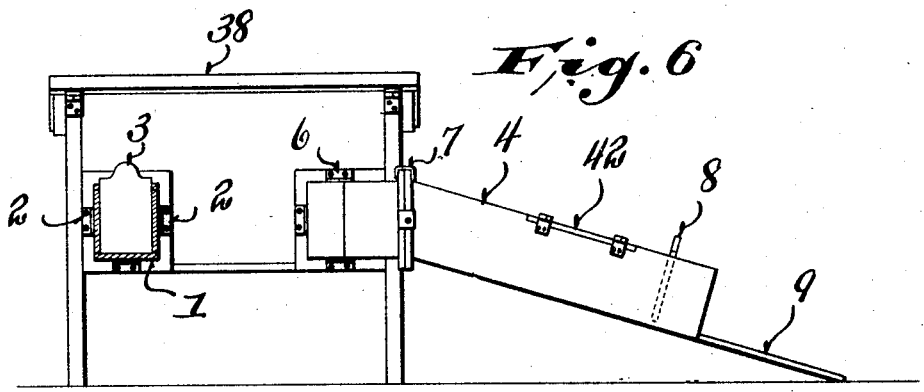
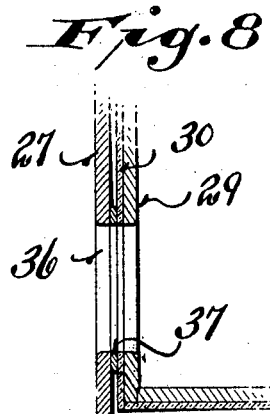
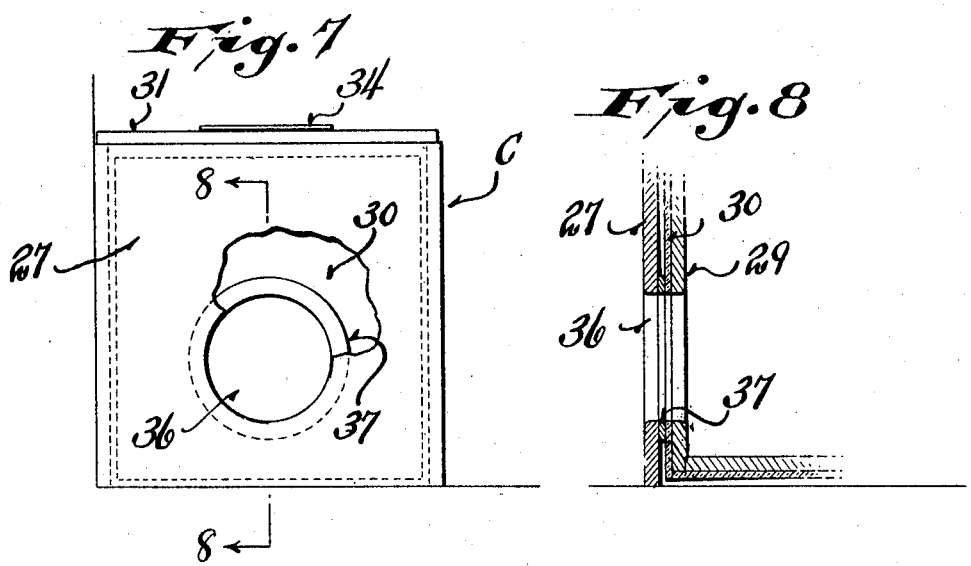
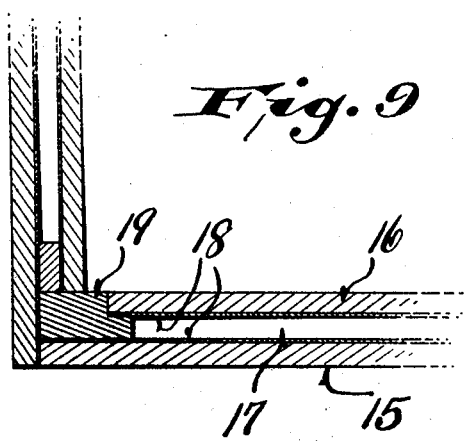
Inventor:
Henry Boldt Patented Nov. 26, 1929

1,737,073

UNITED STATES PATENT OFFICE

HENRY BOLDT, OF APPLETON, WISCONSIN

BREEDING KENNEL

Application filed April 14, 1927. Serial No. 183,715.

This invention relates to breeding kennels, and is particularly directed to a fox breeding kennel.

In fox kennels as heretofore constructed, difficulty has been experienced in providing a kennel which will fulfill the requirements of a large number of breeders who have different weather conditions, and also different exposures for the kennels.

Objects of this invention are to provide a novel form of kennel which has a den, a removable nest box, a sun room, and runways so constructed that they may be changed end for end, reversed or directed as desired by the purchaser so as to exactly suit the particular requirements of the individual purchaser.

Further objects are to provide a novel form of kennel which is substantially knocked down in construction and which may be readily shipped and easily assembled, which is warm, and is formed of multi-ply walls with air spaces and with a removable nest box carried within the main box, such kennel also providing for accommodation of more than one nest box, if desired, and permitting shifting of the nest box as required.

Further objects are to provide a kennel in which there is no direct draft, but in which a very warm and frost-proof construction is secured with the addition of a screened sun-room provided with storm doors adapted to be closed without removing the screens in the event that unusual weather conditions obtain.

Further objects are to provide a kennel with easily detachable runways and with doors providing ready access to the several parts of the kennel and also providing for the trapping of a fox within any desired portion of the kennel.

An embodiment of the invention is shown in the accompanying drawings in which:—

Figure 1 is a side elevation of the kennel;

Figure 2 is a plan view with the cover or roof removed from the den;

Figure 3 is a transverse sectional view on the line 3—3 of Figure 2;

Figure 6 is a sectional view on the line 6—6 of Figure 2;

Figure 7 is a view corresponding approximately to a section on the line 7—7 of Figure 2 with, however, the main portions of the den omitted;

Figure 8 is a sectional view on the line 8—8 of Figure 7;

Figure 9 is a horizontal sectional view through a corner post of the den.

Figure 4:
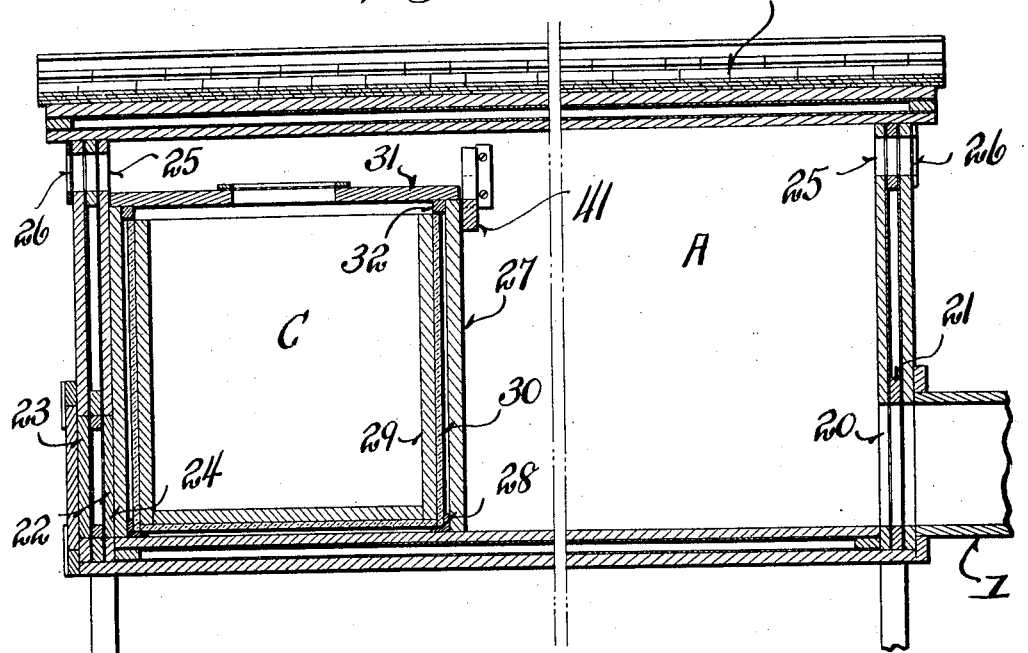
Figure 4 is a sectional view on the line 4—4 of Figure 2.
Figure 5:
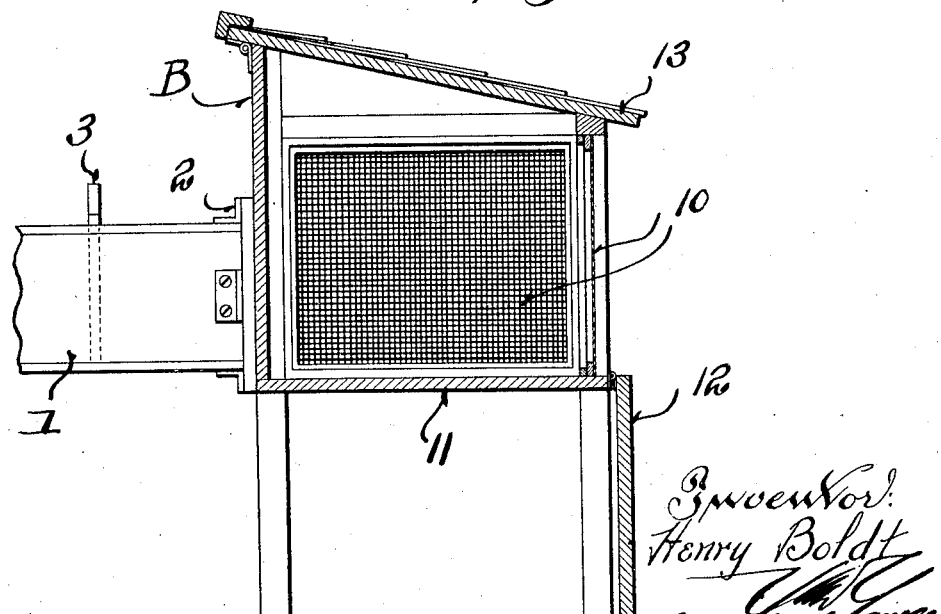
Figure 5 is a sectional view through the sun-room on the line 5—5 of Figure 2.

Referring to the drawings, it will be seen that the kennel comprises three main portions, namely, a den "A", a sun-room "B", and a nest box "C", as may be seen from Figures 1, 2, and 4. The sun-room "B" is joined to the den "A" by means of a closed runway 1 which is detachably secured in place by means of angular screw receiving clips 2, as shown in Figures 1 and 5. This runway is provided with a sliding door 3 to aid in trapping the animals as desired. The sun-room is also provided with a closed runway 4 which is secured by means of clips 6 detachably to the sun-room and which is made in sections held by hook-like members 7 so that they may be slid downwardly into engagement with each other, as shown in Figure 2. Further, it is to be noted that this runway, as shown in Figure 6, is provided with a sliding door 8 to aid in trapping the animals, as desired. The end of the runway 4, as shown in Figures 2 and 6, is provided with an extension 9 adapted to rest upon the ground. The parts A and B are supported by legs, as indicated.

Consider first the sun-room B. This sun-room, as shown in detail in Figure 5, consists of the vertical walls provided with removable screen panels 10, a bottom 11, storm doors 12, hinged adjacent the panels and a hinged shingled top 13. It is provided with two openings on its rear side towards the den which receive the runways 1 and 4, as previously described.

Under normal conditions, the doors will hang down as shown in Figure 1, thus providing a very airy, sunny room. If, however, stormy weather obtains, all of the doors may be closed or else certain of the doors may be closed, as needed and held closed in place by means of clips 14.

It is to be noted particularly that the runways 1 and 4 may be interchanged with reference to the sun-room B so as to give the purchaser great flexibility in the arrangement of the different parts of the apparatus, as required to secure the requisite relative positioning of the parts to suit his particular needs.

Referring now to the den A, it will be seen particularly from Figures 4 and 9, that it consists of a bottom, side walls, and top, each of which is constructed of multi-ply material. For example, the side wall may be considered in detail, as shown in section in Figure 9. They consist of an outer wall 15, preferably of pine, and an inner wall 16, preferably of cedar, with an air space 17 between such walls. Further, felt linings 18 are provided on the inner sides of the walls 15 and 16. These walls are secured to corner posts 19, recessed, as shown, to receive the walls. The end walls, top, and bottom, are also formed in a similar manner and are detachably secured to the corner posts, and the other walls by any suitable fasteners.

It is to be noted that the den A is provided with an aperture or entrance opening 20 at opposite ends. These entrance openings have a spacing member 21 surrounding them to properly hold the walls apart and either one of them may communicate with the closed runway 1, as shown, for instance, on the right hand side of Figure 4. The doorway or opening not in use is closed by means of a plate 22, as shown on the left hand side of Figure 4. This plate carries an outer and an inner wall 23 and 24, each provided with linings of felt, similar to that previously described. This closure door is held in place by any type of fastener desired.

It is to be noted also that small ventilating openings 25 are provided adjacent the top of the kennel and are screened, as indicated at 26. These ventilating openings may be closed in any suitable manner found necessary, although normally they will be left open, as they do not create a direct draft.

An inner nest box C is carried within the kennel A at either end thereof. For instance, as shown in Figure 4, it is placed adjacent the left hand side of the kennel A and consists of a rectangular box-like member having side walls 27 and open at its top and bottom. The bottom portion of the side walls carry angle irons 28 within which a removable inner nest box 29 rests. This nest box is also provided with a plasterboard lining 30. The inner nest, therefore, is spaced from the side walls and end walls of the nest box 27, and also from the bottom of the main box or den to provide an additional air space to secure additional protection against cold.

It is provided with a removable top 31 which has a cleat 32 around its margin and spaced inwardly a slight distance. This cleat fits within the outer walls 27 and thus correctly positions the parts. The top 31 is, in reality, formed of two sections joined together by hinges 33, as shown in Figure 2, to provide access to the inner nest, as needed. Further, one of the parts of the top is provided with a screened ventilator 34 which, if desired, may be covered with straw when unusual protection is required.

The nest, as a whole, is removable, and in addition is equipped with an inner removable portion separable from the outer portion for cleaning or other purposes, as required. Further, it is to be noted that the air space between the inner and outer members of the nest box is also insured by the vertical angle iron 35 (see Figure 2) carried by the outer portion of the nest box. Entrance is afforded by means of an opening 36 through one of the outer walls 27 as shown in Figures 7 and 8. This opening is surrounded by a spacer 37 against which the plaster board 30 of the inner nest walls 29 contacts. This opening 36 extends, as shown in Figures 7 and 8, through the inner wall of the nest box and is preferably rounded at its margin to guard against damage to the animals.

It is to be noted also that the double wall top, as shown in Figures 3 and 4, is provided with wooden shingles 38 and is properly sloped, similar to the top of the sun-room. This roof or cover is hinged, as indicated at 39 in Figure 3, and may be provided with a counterweight 40 to facilitate lifting the cover, as the cover is relatively large.

It is also preferable to provide a transversely extending slanting bar or strap member 41 (see Figures 2 and 3) within the kennel which contacts with the side of the nest box and prevents displacement thereof. Further, it will be seen that this transversely extending member keeps the foxes from crawling on top of the nest box.

It is to be noted, particularly that the sun-room B may be positioned to the right or the left of the kennel A and may communicate with either of the passageways thereto, the passageway not in use being blocked by the member 22, 23, and 24, which constitute a removable door. In addition to this, the runways may be changed to correspond to the new position of the parts and the outlet runway may extend in either direction from the sun-room. In addition to this, either of the openings into the sun-room may be placed in communication with the runway 1.

It will be seen that a novel form of breeding kennel, primarily adapted for foxes, has been provided in which ready access is afforded to all parts thereof and which may be readily cleaned and inspected, as desired.

Further, it is to be noted particularly that great flexibility in the assembling of the parts is given by the construction outlined in detail above, so that the particular purchaser may suit his exact needs as to exposure for the different parts of the kennel and also in the relative positioning of the sun-room and den and of the runways. In addition to this, the hinged tops provide ready access to either of the two main compartments and the hinged cover or top provides ready access to either end or to the entire area of the nest box.

Further, if desired, a hinged door 42 (see Figure 6) may be provided for the outlet runway, so that an animal hiding in the runway may be readily reached. It will also be noted that if found desirable the closed runway 4 may be connected to the den "A" at either one of the openings 20 or 22. It is to be understood that the den may be made of sufficient length to take two nest boxes, or if desired, to take more. These nest boxes may be held in position by suitable cross pieces, as previously described.

Further than this, in order to provide access from the outside without unduly increasing the weight of the hinged roof, such roof may be made in two or more sections so that the particular part of the kennel desired may have ready access thereto.

It will be seen further that the parts may be shipped in a knocked down condition and may be readily assembled by the purchaser.

Although the invention has been described in considerable detail, such description is intended as illustrative rather than limiting as the invention may be variously embodied and as the scope of such invention is to be determined as claimed.

I claim:

1. A breeding kennel comprising a multi-walled den, a removable nest box therefor and a transversely extending bar in the den for positioning said nest box and for keeping the animals from climbing upon the nest box.

2. A breeding kennel comprising a multi-walled den having air spaces between the walls, and a removable nest box having double walls provided with air spaces, said nest box consisting of an outer nest box open top and bottom, an inner nest box removably held within said outer nest box and supported in spaced relation thereto, and a movable cover for said nest box.

3. A kennel comprising a den, a removable nest box located within said den and adapted to be shifted therein as desired, a sun-room, a runway detachably joining either end of said den with either end of said sun-room, and an outlet runway detachably connected to said sun-room or den and adapted to project therefrom in any one of several directions.

4. A kennel comprising a den, a removable nest box located within said den and adapted to be shifted therein as desired, a sun-room, a runway detachably joining either end of said den with either end of said sun-room, and an outlet runway detachably connected to said sun-room or den and adapted to project therefrom in any one of several directions, said runways having sliding doors therein, said den having a transversely extending interiorly located strap for positioning said nest box and for keeping animals from climbing upon said nest box.

In testimony that I claim the foregoing I have hereunto set my hand at Appleton, in the county of Outagamie and State of Wisconsin.

HENRY BOLDT.